J. P. STRICKLER.
PIPE COUPLING.
APPLICATION FILED FEB. 17, 1911.

1,007,989.

Patented Nov. 7, 1911.

Witnesses
G. C. Drumm
A. L. Phelps

Inventor
James P. Strickler
By C. C. Shepherd
Attorney

UNITED STATES PATENT OFFICE.

JAMES P. STRICKLER, OF COLUMBUS, OHIO.

PIPE-COUPLING.

1,007,989.   Specification of Letters Patent.   Patented Nov. 7, 1911.

Application filed February 17, 1911. Serial No. 609,161.

*To all whom it may concern:*

Be it known that I, JAMES P. STRICKLER, a citizen of the United States, residing at Columbus, in the county of Franklin and State of Ohio, have invented certain new and useful Improvements in Pipe-Couplings, of which the following is a specification.

This invention relates to an improved form of pipe coupling, and is particularly designed to connect the abutting ends of conduit pipes in such a manner that a fluid-tight structure is provided and one which is incapable of longitudinal movement when once placed in position connecting said pipes.

It is further aimed by this particular structure of pipe coupling to render the same applicable with the least possible delay and with greatest facility.

The preferred embodiment of the invention is shown in the accompanying drawings, in which—

Figure 1:
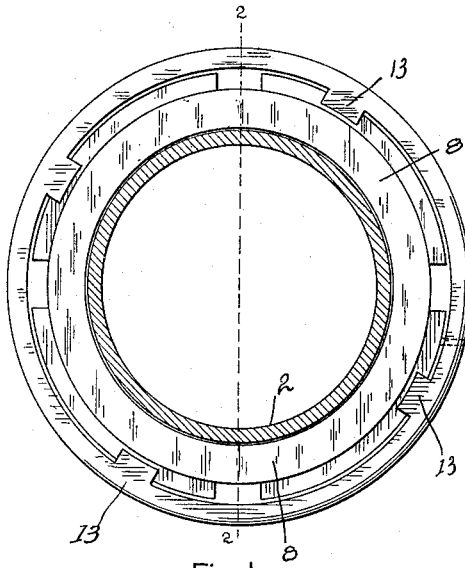
Figure 2:
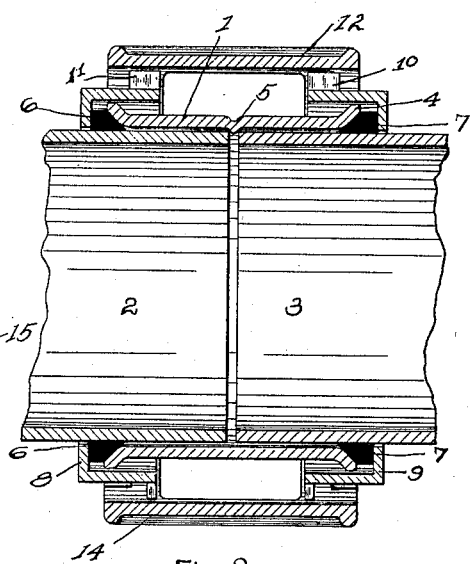
Figure 3:
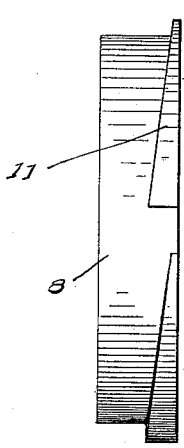
Figure 4:
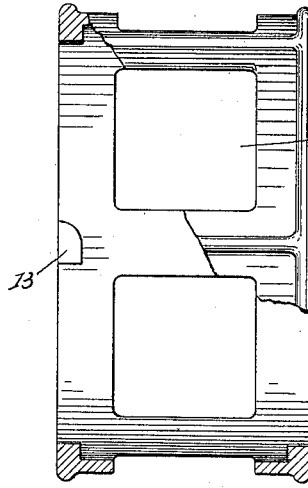
Figure 5:
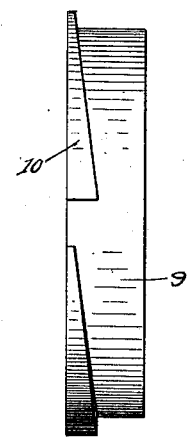

Figure 1 is an end view of the pipe coupling in applied position, Fig. 2 is a longitudinal section taken on line 2—2 of Fig. 1, Fig. 3 is a detail view of one of the rings utilized for locking the pipe coupling in place, Fig. 4 is a view partly in section of the embracer used complementally with these rings, and, Fig. 5 is a view similar to Fig. 3, of the ring used in conjunction with the opposing end of the embracer.

Referring specifically to the different figures of the drawing, in which similar characters of reference designate corresponding parts, a surrounding ring 1 is provided to receive the ends of the pipes 2 and 3. This ring is flared outwardly at either end as at 4 and is provided at an approximately central point with a series of lugs or struck-up portions 5. It will be apparent that the struck-up portions 5 serve the purpose of centering the pipe ends within the ring 1. Adapted to fit within the flared ends of the ring 1 and in contact with the pipes 2 and 3 are annular washers 6 and 7 of any compressible material. These washers are preferably of wedge form. Fitting upon the ends of the ring 1 are caps 8 and 9 preferably L-shaped in cross section and having the shorter legs of said L abutting the outer ends of the washers 6 and 7. Said caps 6 and 7 are each provided with a plurality of inclined planes 10 and 11 spaced apart. Coöperating with said caps is an embracer ring 12 provided with inwardly extending lugs 13 spaced similarly to the interruptions between the inclined planes 10 and 11. The embracer ring is preferably provided with cut-away portions 14 in its periphery to facilitate rotation of the same by a wrench of any type. It is desirable that a set screw 15 be threaded into the thickened ring 12 in such a position that it may be screwed downwardly into frictional abutment with the periphery of one of the inclined planes.

The operation is as follows: The ring 1 is fitted upon the abutting ends of the pipes 2 and 3, the lugs 5 serving to center these abutting ends properly and at the same time the washers 6 and 7 having been placed beneath the flared portions of the ring and the caps 8 and 9 being in place in contact therewith, the embracer ring is held in a central position. The ring caps 6 and 7 are then moved longitudinally upon the pipe, causing the lugs 13 to pass between the inclined portions. The embracer ring 12 is then rotated and the contact of the lugs 13 with the inclined planes 10 and 11 serve to draw the ring caps into compressing relation with the washers 6 and 7. Thus the pipes have their abutting ends brought into a fluid-tight contact with a maximum rapidity.

The great difficulty in the production of a perfect pipe-coupling is, and has always resided, in the danger of a blow-out. This danger is very real and is well understood and recognized to be a prime factor for consideration in pipe couplings. The cause of a blow-out is necessarily the existence, in the pipe coupling, of some weak point, that is, some point which is weak in comparison with the other structural features of the pipe coupling. It has long been known in the art that the utilization of a multiple bolt structure, is necessarily subject to the drawback that it is practically impossible to operate the bolts in a manner to attain a perfectly equal compression. Consequently, some one bolt exercises a degree of stress considerably less than the other bolts, with the result that this relatively weak point is gradually made weaker in constant use, until the blow-out occurs. With my structure, the pressure upon the packing is necessarily equal at every point, because of the simultaneously operative inclined planes and the gaskets are compressed gradually but firmly in an even manner by the wedge action of these planes.

A further important feature of my invention rests in the fact that the compression collars do not turn upon the gaskets and there is, consequently, no shearing effect on said gaskets. Practical workers in the art well understand the advantage of doing away with this shearing effect.

What I claim, is—

1. A pipe coupling comprising an embracing ring for receiving the abutting ends of pipes, ring caps fitting over the ends of said ring, washers interposed there-between, a sleeve fitting over said ring caps, and complemental lugs and inclined planes for drawing said ring caps into position to compress said washers.

2. A pipe coupling comprising a ring having its ends outwardly flared, washers fitting within said flared portions and in contact with the pipes, ring caps embracing said washers, there being inclined planes formed in series upon said ring caps, an embracing ring for said ring caps, and lugs upon said embracing ring adapted to coöperate with said inclined planes for forcing said washers into operative relation.

3. A pipe coupling comprising a ring, a central series of lugs annularly disposed within said ring, said ring having outwardly flared ends, washers fitting within said outwardly flared ends, ring caps fitting upon said washers, there being a series of spaced inclined planes upon the outer periphery of said ring caps, an embracing sleeve for said ring caps, lugs internally formed on said sleeve and properly spaced to pass between said inclined planes whereby rotation of said embracing sleeve will draw said ring caps together to compress said washers.

4. A pipe coupling comprising a cylindrical ring of imperforate material, and a centrally positioned internal tangular rib formed on said ring, flaring ends for said ring, gaskets fitting in said flaring ends, washer rings on the pipes and abutting said gaskets, inwardly extending body portions on said rings, spaced lugs on the inwardly extending body portions and formed with wedge inclines, a central embracing yoke, internal lugs on said yoke formed with rounded edges and adapted to move upon the said inclines to draw said rings into compressing relation with said gaskets.

5. A pipe coupling comprising a cylindrical ring with flared ends, packing within said ends, compression collars abutting said packing, an embracing yoke and means on said yoke and collars for forcing said collars into compressing action against said packing without rotation of said collars when said yoke is bodily rotated.

6. A pipe coupling comprising a cylindrical ring adapted to have inserted therein the ends of the pipes to be coupled, said ring having flaring ends, gaskets fitting in said flaring ends, washer rings comprising vertical portions which bear against said gaskets and horizontal portions which extend inwardly over the ends of said ring, spaced lugs carried by the horizontal portions of the washer rings and having inclined outer faces, a yoke member embracing the first named ring and the washer rings, and inwardly extending lugs carried by said yoke member which engage with the inclined faces of the spaced lugs of the washer rings whereby when the yoke member is rotated the washer rings are forced toward each other to compress the gaskets.

In testimony whereof I affix my signature in presence of two witnesses.

JAMES P. STRICKLER.

Witnesses:
A. L. PHELPS,
JOHN H. EAGLESON.

Copies of this patent may be obtained for five cents each, by addressing the "Commissioner of Patents, Washington, D. C."